No. 864,416. PATENTED AUG. 27, 1907.
J. A. FONVILLE.
HOOK.
APPLICATION FILED DEC. 6, 1906.
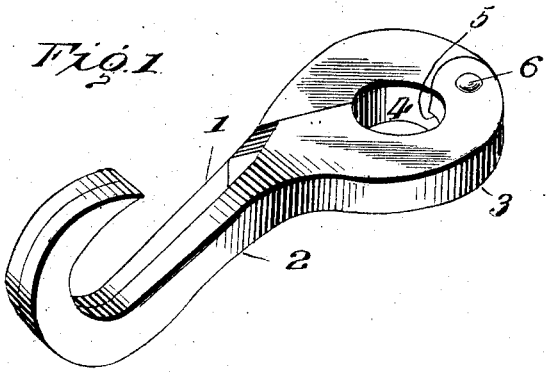
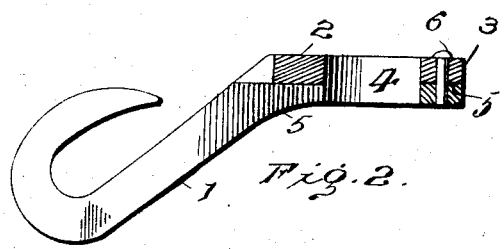
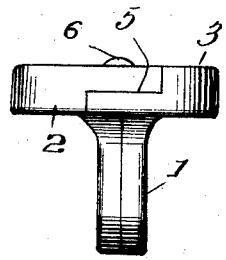
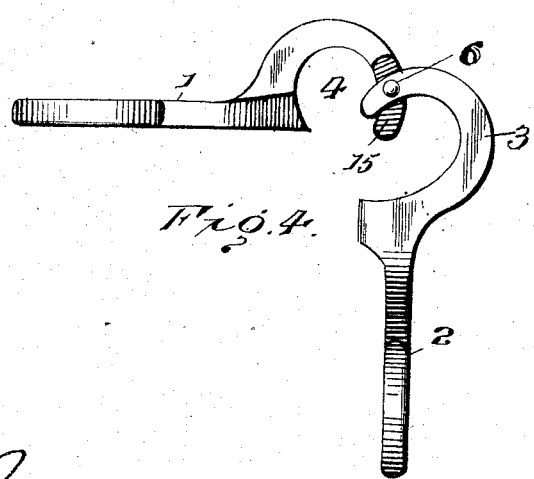
Witnesses
Inventor
J. A. Fonville
By
Attorneys

UNITED STATES PATENT OFFICE.

JOHN A. FONVILLE, OF GIBSON STATION, INDIAN TERRITORY.

HOOK.

No. 864,416.  Specification of Letters Patent.  Patented Aug. 27, 1907.

Application filed December 6, 1906. Serial No. 346,665.

*To all whom it may concern:*

Be it known that I, JOHN A. FONVILLE, a citizen of the United States, residing at Gibson Station, District #7, Indian Territory, have invented certain new and useful Improvements in Hooks, of which the following is a specification.

The object of my invention is to provide an improved construction of hook adapted for use as a clevis or as a whiffle tree hook or the like, and embodying peculiarly constructed and arranged hook members pivotally connected together so that they may be readily clamped around a part to which it is desired to attach the hook and held securely in place by the ring or similar part inserted therein, and which may be readily removed and replaced by another, whenever broken or when for any similar reason it becomes necessary to replace the hook.

For a full understanding of the invention and the merits thereof and also to acquire a knowledge of the details of construction and the means for effecting the result, reference is to be had to the following description and accompanying drawings, in which:

Figure 1 is a perspective view of my improved hook. Fig. 2 is a vertical sectional view thereof. Fig. 3 is an edge view of the hook. Fig. 4 is a plan view of the hook with the parts swung open.

Corresponding and like parts are referred to in the following description and indicated in all the views of the drawings by the same reference characters.

My improved hook embodies two hook members 1 and 2, the butts 3 of which are curved in a plane at right angles to the plane of the hook portion and are pivotally connected together with their ends overlapping, so as to form, when closed, the eye 4. Each of the butts 3 is formed on opposite faces with recesses 5, the recesses of the respective butts mating, and 6 designates the pivot stud which extends through the overlapping outer ends of the butt portions 3 at the far side or ends from the hook portions of the members 1 and 2 and in line with said hook portions when closed. Preferably the hook portions of the members 1 and 2 are off-set with respect to the butts 3, as shown.

In the practical use of my improved hook, it is manifest that the two hook members may be separated at their free hook ends so that the part to which it is desired to attach the hook may be received between the curved ends of the butts 3 and the two hooks are then brought together so as to produce the eye 4. When a ring or other draft device is inserted over the hooks, it is obvious that the two hook member will be held close together and the hook as a whole tightly clamped around the part to which it is attached.

From the foregoing description in connection with the accompanying drawings, it will be seen that I have provided a very simple construction of split hook which may be readily applied to and detached from a whiffle tree or other part, and which is durable in construction, while at the same time it provides means for easily removing the hook if it should become broken, so that it may be replaced by another.

Having thus described the invention, what is claimed as new is:

As an improved article of manufacture, the herein described split hook, embodying two hook members, formed with butts 3, that are curved in opposite directions and in a plane at right angles to the plane of the hooks, the butts being provided with oppositely facing mating recesses and overlapping at their outer ends and also designed to partially overlap when closed, the hook portions of the hook members being off-set with respect to the butts, and a pivot stud extending through the outermost ends of the butts 3, said pivot stud being located in line with the hook portions when the latter are closed.

In testimony whereof I affix my signature in presence of two witnesses.

JOHN A. FONVILLE. [L. S.]

Witnesses:
W. T. DRAKE,
W. O. RITTENHOUSE.